(12) United States Patent
Lin

(10) Patent No.: US 11,159,277 B2
(45) Date of Patent: Oct. 26, 2021

(54) METHOD FOR DATA TRANSMISSION AND HARQ RETRANSMISSION

(71) Applicant: ORANGE, Issy-les-Moulineaux (FR)

(72) Inventor: Hao Lin, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 0 days.

(21) Appl. No.: 16/626,734

(22) PCT Filed: Jun. 27, 2018

(86) PCT No.: PCT/FR2018/051568
§ 371 (c)(1),
(2) Date: Dec. 26, 2019

(87) PCT Pub. No.: WO2019/002760
PCT Pub. Date: Jan. 3, 2019

(65) Prior Publication Data
US 2020/0119857 A1    Apr. 16, 2020

(30) Foreign Application Priority Data

Jun. 27, 2017   (FR) ...................... 1755887

(51) Int. Cl.
*H04L 1/18* (2006.01)
*H04L 5/00* (2006.01)
*H04W 72/04* (2009.01)

(52) U.S. Cl.
CPC .......... *H04L 1/1816* (2013.01); *H04L 1/1861* (2013.01); *H04L 1/1896* (2013.01); *H04L 5/0051* (2013.01); *H04W 72/0413* (2013.01)

(58) Field of Classification Search
CPC ... H04W 28/04; H04W 72/04; H04W 72/042; H04W 88/08; H04L 5/0007

USPC ........................................................ 370/329
See application file for complete search history.

(56) References Cited

U.S. PATENT DOCUMENTS

2009/0147688 A1* 6/2009 Matsumoto .......... H04J 11/0056
370/242
2010/0309863 A1* 12/2010 Sangiamwong .......... H04L 1/06
370/329

FOREIGN PATENT DOCUMENTS

WO     2017166373 A1   10/2017
WO     WO 2017/166373 A1 * 10/2017 ............... H04L 1/00

OTHER PUBLICATIONS

Written Opinion of the International Searching Authority dated Oct. 11, 2018 for corresponding International Application No. PCT/FR2018/051568, filed Jun. 27, 2018.
International Search Report dated Oct. 4, 2018 for corresponding International Application No. PCT/FR2018/051568, filed Jun. 27, 2018.
Written Opinion of the International Searching Authority dated Oct. 4, 2018 for corresponding International Application No. PCT/FR2018/051568, filed Jun. 27, 2018.

* cited by examiner

*Primary Examiner* — Peter G Solinsky
*Assistant Examiner* — Sanjay K Dewan
(74) *Attorney, Agent, or Firm* — David D. Brush; Westman, Champlin & Koehler, P.A.

(57) ABSTRACT

A method of telecommunication between a base station and user equipment. The method includes: identifying disjoint lists of pilots, namely a first for initial uplink transmissions and a second for uplink retransmissions, and defining a first mapping between the pilots of the two lists.

6 Claims, 4 Drawing Sheets

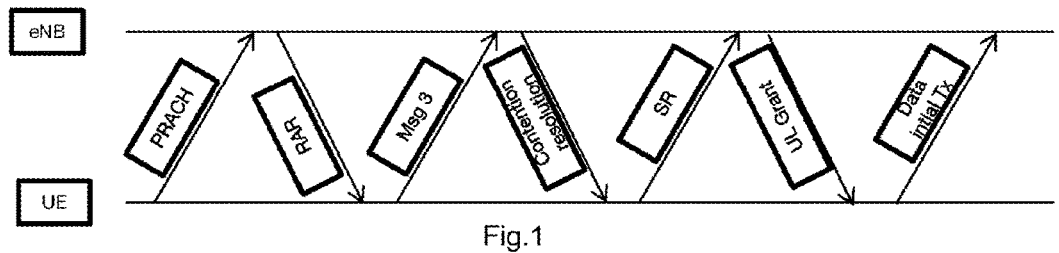
Fig.1
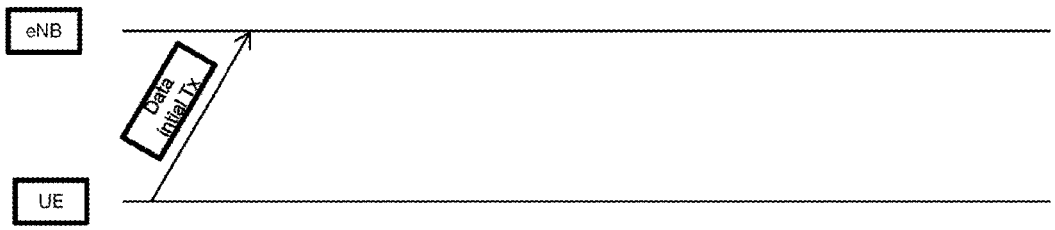
Fig.2
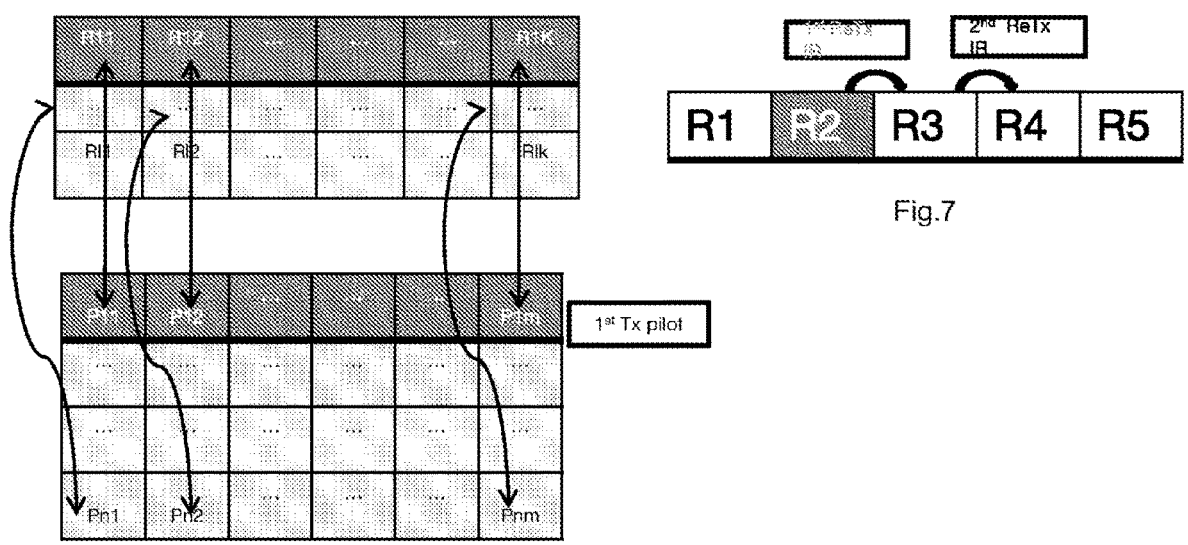
Fig.3
Fig.7
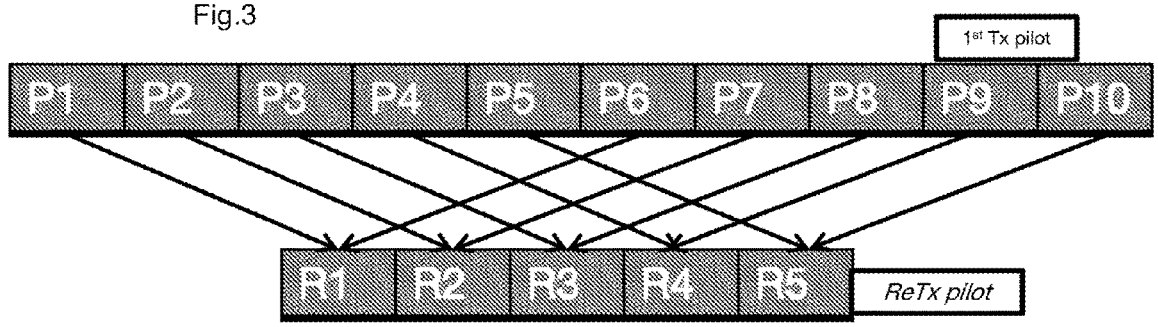
Fig.4

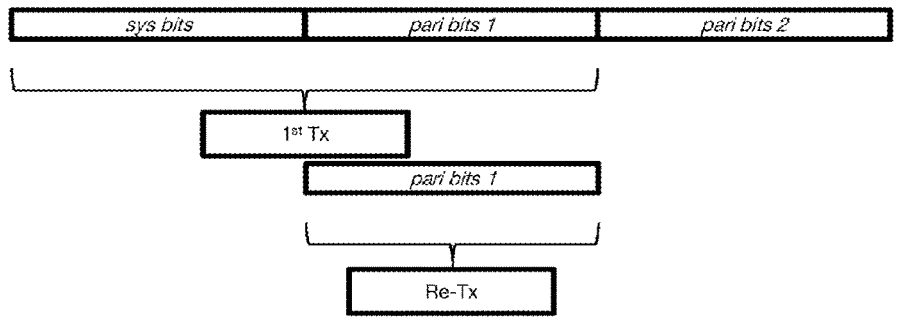
Fig.5
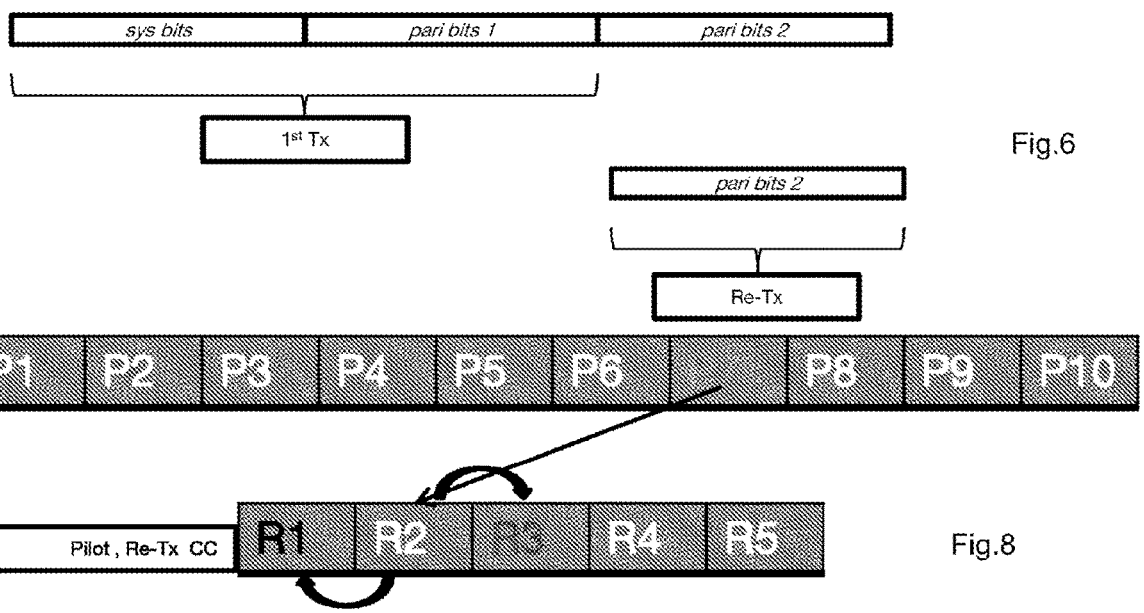
Fig.6
Fig.8
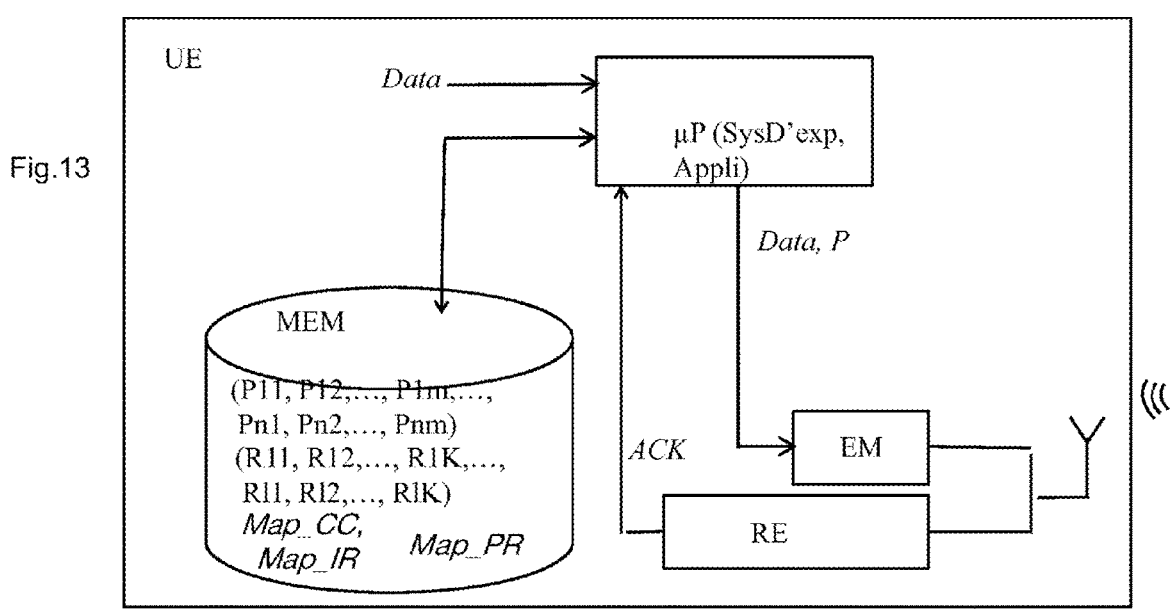
Fig.13

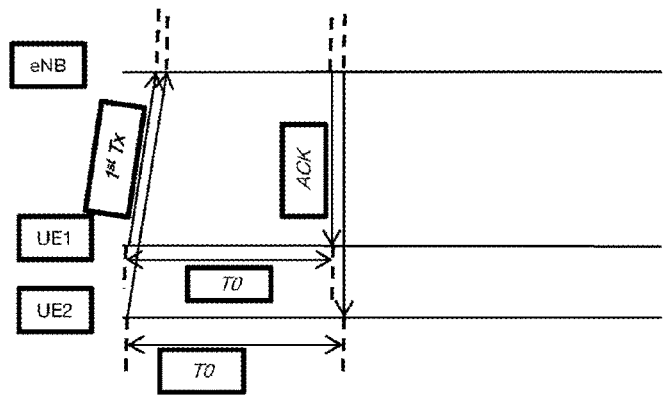
Fig.9
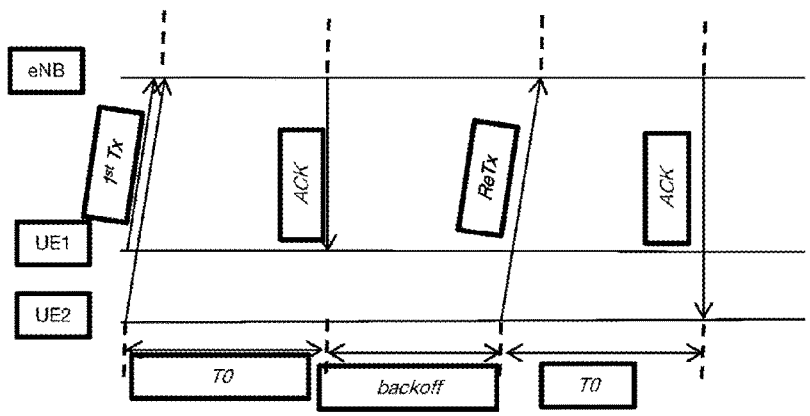
Fig.10
Fig.14
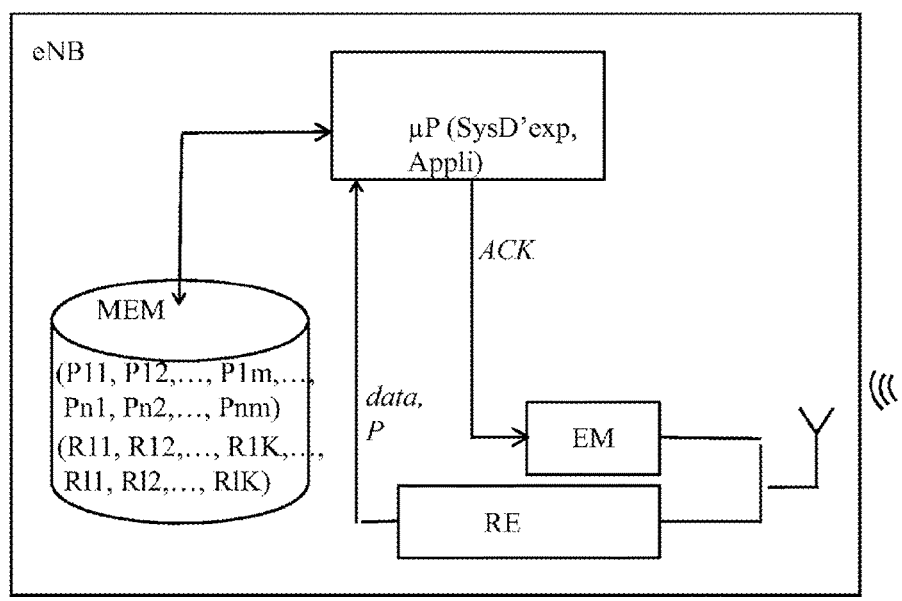

METHOD FOR DATA TRANSMISSION AND HARQ RETRANSMISSION

CROSS-REFERENCE TO RELATED APPLICATIONS

This Application is a Section 371 National Stage Application of International Application No. PCT/FR2018/051568, filed Jun. 27, 2018, the content of which is incorporated herein by reference in its entirety, and published as WO 2019/002760 on Jan. 03, 2019, not in English.

FIELD OF THE DISCLOSURE

The present invention pertains to the field of telecommunications. Within this field, the invention pertains more particularly to the protocols during transmissions between equipments and a base station.

The invention finds applications notably in the field of wireless communications and in particular and without limitation, in the field of so-called mMTC communications (the acronym standing for the English terms "massive Machine Type Communications").

This type of communications refers to a context of massive deployment of devices in an area covered by a base station, these devices being capable of transmitting data to the base station. In this context the transmissions of the various equipments can occur sporadically.

Indeed, densification of sensor networks, the role of which is to upload data to an entity for utilizing these data, is foreseen in the years ahead. It is already possible to cite the existing networks of video-surveillance cameras that upload video data. There are other networks currently in deployment in very varied fields such as energy with the uploading of gas or electricity consumption data and such as health with the uploading of patients' physiological data. There is therefore a foreseeable increase in sporadic transmissions of information which will travel through one and the same physical link which will often be a radio link.

BACKGROUND OF THE DISCLOSURE

The systems of future generations (5G, etc.) form the subject of work within the 3GPP to define rules such that a base station is able to simultaneously receive communications originating from mobile terminals which demand almost permanent connectivity with a high or indeed very high throughput (several megabits/s) and sporadic communications originating from sensors.

Furthermore, the transmissions arising from the sensors have the particular feature of being low bitrate (a few bits/s, about 20 bytes per day), random and patchy in character.

The so-called LTE standards published by the 3GPP specify methods of transmitting and of retransmitting when the receiver does not succeed in detecting or decoding correctly the data transmitted by a transmitter. There is thus a so-called handshake protocol illustrated by FIG. 1. The user's equipment UE makes a request for authorization of transmission to the base station eNB by transmitting a preamble by means of a signaling channel PRACH. When the base station eNB has successfully identified the preamble, it responds through a signal RAR (Random Access Response). On receipt, the user's equipment UE dispatches an authentication signal Msg 3. Should detection be successful, the base station eNB responds through a signal "Contention resolution". On receipt, the user's equipment UE dispatches a scheduling signal SR (Scheduling Request) and waits for the authorization of the base station. The user's equipment UE is authorized to transmit only after the base station eNB has dispatched the UL Grant signal to it. When it is authorized, the user's equipment begins its transmission Data initial Tx.

This grant protocol can provide a stable quality of service adapted to high-bitrate cellular communications termed eMBB (the acronym standing for the English terms "enhanced Mobile Broadband Communications") which require a high data bitrate with a moderate number of active users and few latency constraints.

This grant protocol (handshake) introduces a significant transmission latency since each uplink transmission must follow this grant protocol. It furthermore requires a significant number of uplink signaling signals. These constraints are deemed very expensive for an mMTC device which may have low capabilities both in terms of electrical power and of calculational power.

A new type of protocol is mentioned for communications of this type, this being the so-called GF ("Grant-Free" in English) grant-free transmission protocol. According to this protocol, a user transmits his data to the base station as soon as his data are ready to be transmitted without waiting for or requesting an authorization, as illustrated by FIG. 2.

SUMMARY

The present invention proposes a method of telecommunication between a base station and users comprising:
  identification of two disjoint lists of pilots, a first of which being for initial uplink transmissions and a second of which being for uplink retransmissions,
  definition of a first mapping between the pilots of the two lists.

According to a particular embodiment, the method furthermore comprises the definition of first different patterns defining a first level of correspondence between pilots of the second list so as respectively to distinguish different modes of retransmission.

According to a particular embodiment, one of the modes is an HARQ with incremental redundancy mode.

According to a particular embodiment, one of the modes is an HARQ with repetition mode.

According to a particular embodiment, at least two retransmissions are defined for one and the same transmission. According to this embodiment, the method furthermore comprises a second pattern defining a second level of correspondence between pilots of the second list.

Furthermore, a subject of the invention is a base station adapted to implement a telecommunication method comprising a transmitter and a receiver which are linked to an antenna, a microprocessor and a memory. The base station is such that:
  the memory is adapted to store two disjoint lists of pilots, a first of which being for initial uplink transmissions and a second of which being for uplink retransmissions, and to store a first mapping between the pilots of the two lists,
  the microprocessor is adapted to compare a pilot provided by the receiver after reception of data received by the antenna with the stored lists of pilots so as to determine whether it the data received correspond to an initial transmission or to a retransmission.

Furthermore, a subject of the invention is a user equipment adapted to implement a telecommunication method comprising a transmitter and a receiver which are linked to an antenna, a microprocessor and a memory. The equipment is such that:

the memory is adapted to store two disjoint lists of pilots, a first of which being for initial uplink transmissions and a second of which being for uplink retransmissions, and to store a first mapping between the pilots of the two lists, the microprocessor is adapted to determine a first pilot from among the first stored list of pilots and to control the transmitter to transmit a data packet comprising the pilot and the microprocessor is adapted to wait for an acknowledgment signal for a determined duration before controlling the transmitter for a retransmission.

BRIEF DESCRIPTION OF THE DRAWINGS

Other characteristics and advantages of the invention will become apparent during the description which follows in conjunction with the appended figures which are given by way of nonlimiting example.

FIG. 1 is a diagram of the so-called handshake protocol HS.

FIG. 2 is a diagram of the so-called Grant-Free protocol GF.

FIG. 3 represents two lists of pilots with the identification of a mapping between the two lists according to a first characteristic of the method of transmission according to the invention.

FIG. 4 represents an exemplary mapping of circular and sequential type between the two lists of pilots.

FIG. 5 is a diagram of the HARQ with repetition CC mode.

FIG. 6 is a diagram of the HARQ with incremental redundancy IR mode.

FIG. 7 is a diagram of an exemplary pattern for a mode of retransmission with incremental redundancy IR.

FIG. 8 is a diagram of an exemplary use of a pilot.

FIGS. 9 and 10 are diagrams illustrating the running of the method according to the invention.

FIG. 13 is a diagram of the simplified structure of user equipment.

FIG. 14 is a diagram of the simplified structure of a base station.

DETAILED DESCRIPTION OF ILLUSTRATIVE EMBODIMENTS

Figure 11:
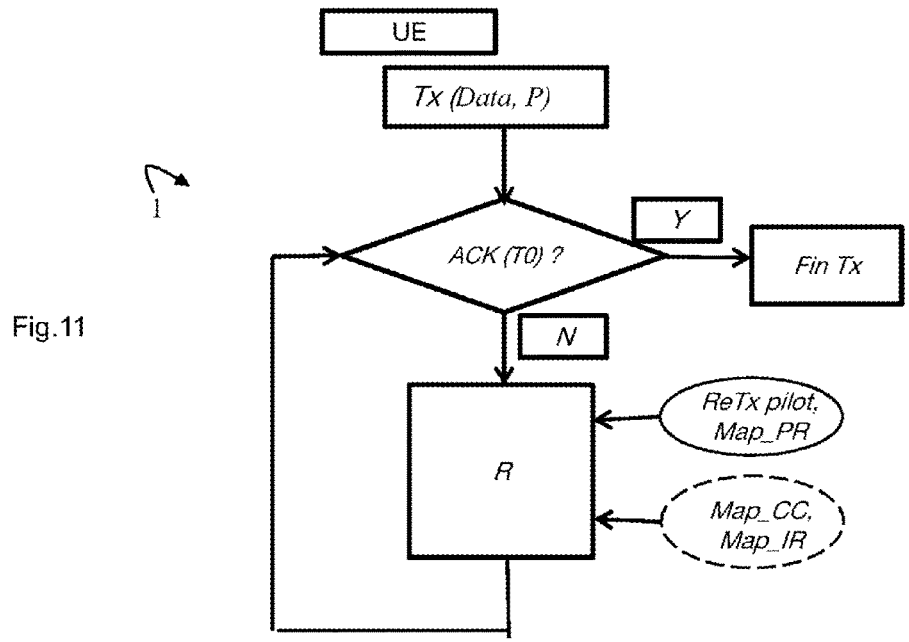
FIGS. 11 and 12 are flowcharts of the running of the method at the user level and at the base station level.

The context of the invention is that according to which the base station eNB knows the list of the users UE that are liable to communicate with it according to a method of GF grant-free transmission as well as their identifier UE ID. Furthermore, according to this context any transmission complies with the format according to which the data transmitted comprise a transmitted-data verification field, for example of CRC (Cyclic Redundant Check) type triggering an acknowledgment ACK as feedback should the data be decoded correctly. This field makes it possible to check that the data are transmitted without error and that in particular the identifier UE ID of the transmitter included in the data is correct. Furthermore according to this format, any transmission by a UE comprises a pilot.

Furthermore, according to this context, a grid of time frequency resources dedicated to GF grant-free access is identified and the telecommunication system is configured accordingly. The base station thus knows the frequency and temporal resources, the block resources according to the terminology of the LTE, dedicated to a GF transmission. A scheduling between the transmission from a user and the transmission of an acknowledgment signal ACK transmitted by the base station in the case of the correct decoding of the received data is furthermore determined by this context.

According to a first characteristic of the method of transmission illustrated by FIG. 3, the method identifies two disjoint lists (P11, P12, ..., Plm, ..., Pn1, Pn2, ..., Pnm), (R11, R12, ..., R1K, ..., R11, R12, ..., R1K) of pilots. A first list (P11, P12, ..., Plm, ..., Pn1, Pn2, ..., Pnm) of pilots is dedicated to the initial uplink transmissions. The second list (R11, R12, ..., R1K, ..., R11, R12, ..., R1K) of pilots is dedicated to the uplink retransmissions which follow the initial transmissions. These two lists can be of the same size or of different size. These lists are known to the UEs and to the base station eNB.

The number of pilots of the first list is however of sufficient number that each UE of the list of users can select a pilot different from that used by another UE of this list. This selection can be performed in a random manner. Thus, the base station eNB knows, after reception of the pilots of the first list, the number of active users UE.

According to a second characteristic of the method of transmission illustrated by FIG. 3, the method defines a first mapping between the pilots of the two lists. Each pilot of the first list is mapped with a pilot of the second list termed reference pilot ReTx pilot for the retransmissions. A pilot of the second list may possibly be mapped with several pilots of the first list if the lists do not have the same number of pilots.

FIG. 4 represents an exemplary mapping of circular and sequential type between the two lists of pilots.

A user who performs a GF retransmission must use one of the pilots of the second list. The selection of this pilot is no longer random as for the first list. The pilot selected from the second list is that mapped with the pilot used by the user UE during the initial transmission. Thus, the base station eNB has a link to associate the data received during an initial transmission with the data received during a retransmission by consulting the mapping between the two lists of pilots.

If the two lists are of the same size, there is no ambiguity during association. On the other hand if one and the same pilot of the second list is partnered with several pilots of the first list, the association might not be determined with certainty by the base station eNB on the basis solely of the pilots used during the first retransmission. This indeterminacy occurs only if during the initial transmissions two users have used the pilots in correspondence with one and the same pilot of the second list. This case must have a low probability.

According to a third characteristic of the method of transmission, the initial transmission is followed by a retransmission which can be performed according to various modes.

The invention is aimed in particular at adapting an HARQ protocol, which is a retransmission protocol which runs at the level of the physical layers, to access to the grant-free channel. The various modes are for example, a mode of retransmission with repetition CC (Chase Combining HARQ) or a mode of retransmitting with incremental redundancy IR (Incremental Redundancy HARQ).

The HARQ with repetition CC mode is illustrated by FIG. 5. According to this mode, the retransmission pertains to data transmitted during the initial transmission $1^{st}$ Tx: it therefore entails a repetition of an already transmitted segment of data. According to the example illustrated by FIG. 5, the parity bits pari bits 1 accompany the systematic bits sys bits transmitted during the initial transmission 1$^{st}$ Tx. And the parity bits pari bits 1 are repeated during the retransmission Re-Tx. By retransmitting only redundancy data of the initial transmission, the receiver can combine the redundancy data in a coherent manner to obtain an increase in the SNR. This combination consists schematically of a bitwise addition and a division by two. The coding rate after a retransmission with repetition CC is constant in view of the fact that there are no new redundancy data during the retransmission.

The HARQ with incremental redundancy IR mode is illustrated by FIG. 6. According to this mode, the retransmission Re-Tx pertains to data not transmitted during the initial transmission: it does not therefore entail a repetition of an already transmitted segment of data but a transmission of new data. The receiver can thus benefit from a more robust coding gain i.e. the coding rate decreases. According to the example illustrated by FIG. 6, the parity bits pari bits 1 accompany the systematic bits sys bits transmitted during the initial transmission 1$^{st}$ Tx. And the parity bits pari bits 2 are transmitted during the retransmission Re-Tx.

To distinguish between these various modes, the method identifies for each mode a pattern of relations between the reference pilot ReTx pilot and the other pilots of the second list. The patterns differ from one another so as to distinguish the various modes from one another. These patterns can be dubbed mapping sub-levels.

An exemplary pattern for a mode of retransmission with incremental redundancy IR is illustrated by FIG. 7. This pattern is according to the example obtained through a right shift by one position. According to this example, it is assumed that the reference pilot ReTx pilot for the retransmissions is R2. To identify that this is a mode of retransmission with incremental redundancy IR, the pilot to be used during the first retransmission is not the pilot R2 but the pilot R3 according to the pattern. If a second retransmission is then performed it must use the pilot R4 according to the pattern. And so on and so forth if other retransmissions follow. An exemplary pattern for a mode of retransmission with repetition CC can be obtained with a left shift by one position at each retransmission level.

Thus, with reference to FIG. 8, if the initial transmission uses the pilot P7 of the first list then according to the mapping defined by FIG. 4, the reference pilot ReTx pilot for the retransmissions is the pilot R2 of the second list. The base station receives a transmission with the pilot P7. If the retransmission uses the pilot R3 then in view of the patterns of the various modes of retransmission, the base station deduces therefrom that the mode is the one with incremental redundancy IR. On the other hand if the retransmission uses the pilot R1 then in view of the patterns of the various modes of retransmission, the base station deduces therefrom that mode is the one with repetition CC.

Figure 12:
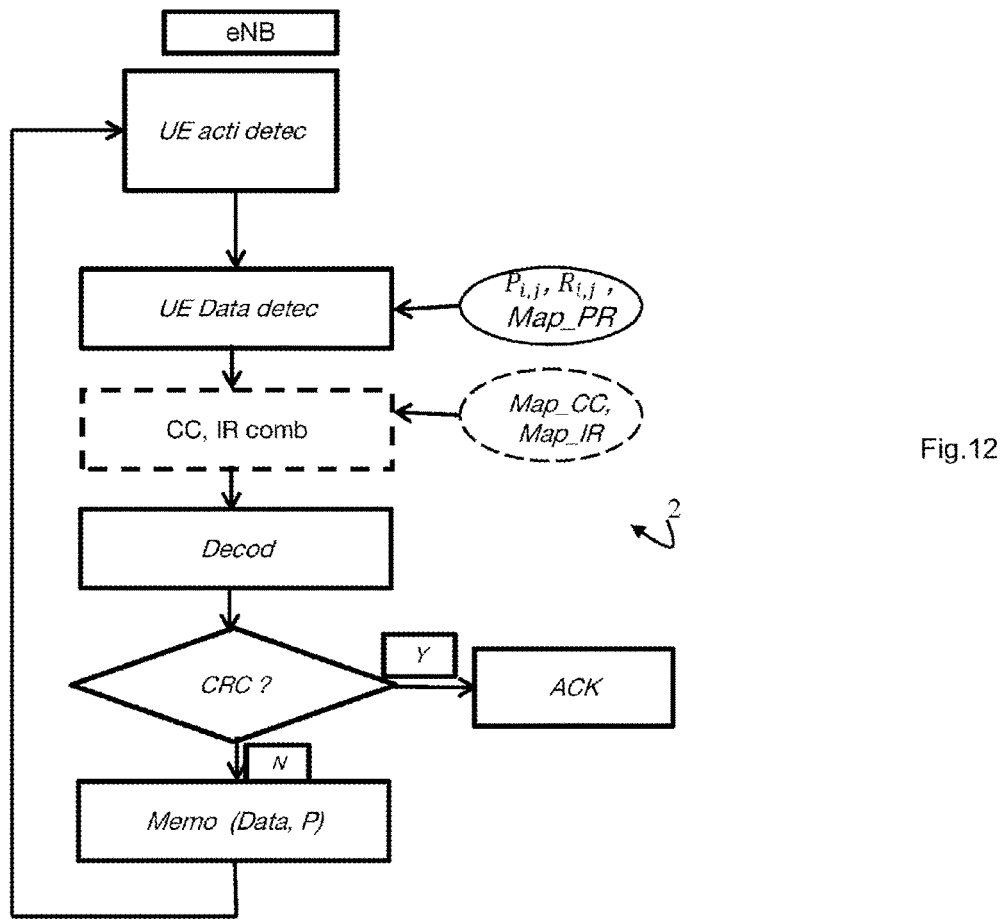

The running of the method is illustrated by FIGS. 9 and 10 and the flowcharts of FIGS. 11 and 12. The flowchart of FIG. 11 shows diagrammatically the running of the method 1 on the user's equipment side. The flowchart of FIG. 12 shows diagrammatically the running of the method 2 on the base station side.

In the case illustrated by FIG. 9 two users UE1, UE2 are active and each transmit Tx (Data, P) an initial transmission of GF grant-free type which comprises a pilot P of the first list.

The base station eNB detects UE acti detec an activity on the resources of the grid dedicated to the GF transmissions i.e. it receives the data Data transmitted by means of these resources by the equipment of a user. The base station eNB detects UE Data detec the pilots P used and thus determines that there are two active users and that is a matter of initial transmissions in view of the fact that these pilots belong to the first list $P_{i,j}$.

The base station eNB attempts to decode Decod the two initial transmissions of these active users, transmitted according to the grant-free protocol GF. This decoding in general comprises a detection UE Data detec of the data received, a channel decoding for each data packet received from a user from among the various active users. By means of a test of the verification field the base station determines whether the decoding is correct CRC ?, Y and then generates an acknowledgment signal ACK per user or determines whether it is not correct CRC ?, N.

In parallel, each of the active users is on standby ACK (T0) ? awaiting the acknowledgment feedback ACK that must be addressed to it by the station eNB if the latter correctly decodes the data transmitted.

After utilization of the verification field and if this field indicates a correct decoding CRC ?, Y, the base station eNB determines the identifier of the users. The data of each of the two initial transmissions being decoded successfully, the base station eNB transmits an acknowledgment signal ACK for each of the two users according to a determined scheduling T0 compliant with the scheduling of the GF grant-free transmissions.

The user UE1, UE2, who receives the acknowledgment signal ACK in accord with the scheduling T0 does not perform Fin Tx a retransmission of the initially transmitted data.

The case illustrated by FIG. 10 differs from that illustrated by FIG. 9 in that only the initial transmission of the user UE1 is correctly decoded by the base station eNB. The base station eNB has not succeeded CRC ?, N in correctly decoding the initial transmission of the user UE2, it stores Memo (Data, P) the initial data received from the user UE2 with the pilot P used by this user UE2. Only the user UE1 receives an acknowledgment signal ACK according to the scheduling T0 of a GF grant-free transmission.

The user UE2 does not receive any acknowledgment signal ACK according to the scheduling determined T0 for a GF grant-free transmission. The user UE2 deduces therefrom that he must perform a retransmission R. In view of the pilot that he has used for the initial transmission, the user UE2 determines the reference pilot ReTx pilot in accordance with the mapping. If several modes of retransmission CC, IR are defined, the user chooses one of these modes. On the basis of the pattern Map_CC, Map_IR associated with this mode, the user UE2 determines the pilot to be used for the first retransmission. The user UE2 performs his retransmission ReTx after a variable time interval backoff.

The user UE2 then passes to standby ACK (T0) ? awaiting the acknowledgment feedback ACK that must be addressed to him by the station eNB if the latter correctly decodes the data initially transmitted with the aid of the data retransmitted.

The base station eNB detects UE acti detec an activity on the grid resources dedicated to the GF transmissions i.e. it receives the data transmitted by means of these resources.

The base station eNB detects UE Data detec the pilot used. By comparing with the lists $P_{i,j}$, $R_{i,j}$ of pilots, it determines that is a matter of a retransmission. By comparing with the mapping Map_PR between the lists, it determines that this retransmission has to be associated with the initial transmission of the user UE2. By using the patterns Map_CC, Map_IR it determines the mode of retransmission by comparing these patterns with the received pilot. The base station eNB thus knows how to combine CC, IR comb the data of the initial transmission with the retransmitted data.

If it successfully CRC ?, Y decodes Decod the combined data, the base station eNB transmits an acknowledgment signal ACK for the user UE2 according to a determined scheduling T0 complying with the scheduling of the GF grant-free transmissions. If it does not correctly decode CRC ?, N the combined data, the base station does not transmit any acknowledgment signal and the method loops on standby awaiting detection of activity on the dedicated resources.

The simplified structure of the equipment of a user according to the embodiments described hereinabove is illustrated by FIG. 13. Such an equipment UE comprises a transmitter EM and a receiver RE which are connected to an antenna, a memory MEM comprising a buffer memory (RAM for example), a processing unit µP equipped for example with a microprocessor and driven by the computer program so as to implement the method 1 of telecommunication according to the invention.

On initialization, the code instructions of the computer program are for example loaded into the buffer memory before being executed by the processor of the processing unit µP. The processing unit µP receives as input data Data prepared typically at the level of an MAC layer and arising for example from a voice application or from an application local to the equipment such as an Internet request toward a web site. The processing unit µP reads the two lists of pilots and the mapping between the two lists, stored in the memory MEM. The microprocessor of the processing unit µP implements the steps of the above-described method 1 of telecommunication, according to the instructions of the computer program.

The simplified structure of a base station according to the embodiments described hereinabove is illustrated by FIG. 14. Such a base station eNB comprises a transmitter EM and a receiver RE which are connected to an antenna, a memory MEM comprising a buffer memory (RAM for example), a processing unit µP equipped for example with a microprocessor and driven by the computer program to implement the method 2 of telecommunication according to the invention.

On initialization, the code instructions of the computer program are for example loaded into the buffer memory before being executed by the processor of the processing unit µP. The processing unit µP receives, as input, data Data, P received by the antenna and processed by the receiver RE. The processing unit µP reads the two lists of pilots and the mapping Map PR between the two lists, stored in the memory MEM. The microprocessor of the processing unit µP implements the steps of the above-described method 2 of telecommunication, according to the instructions of the computer program.

Consequently, the invention also applies to a computer program (or its various modules distributed more particularly between a user equipment and a base station), notably a computer program on or in an information medium, adapted to implement the invention. This program can use any programming language, and be in the form of source code, object code, or of code intermediate between source code and object code such as in a partially compiled form, or in any other desirable form for implementing a method according to the invention.

The information medium can be any entity or device capable of storing the program. For example, the medium can comprise a storage means, such as a ROM, for example a CD ROM or a microelectronic circuit ROM, or else a magnetic recording means, for example a diskette (floppy disk) or a hard disk.

Alternatively, the information medium can be an integrated circuit in which the program is incorporated, the circuit being adapted to execute or to be used in the execution of the method in question.

Moreover, the program can be translated into a transmissible form such as an electrical or optical signal, which can be conveyed via an electrical or optical cable, by radio or by other means. The program according to the invention can be in particular downloaded over a network of Internet type.

Although the present disclosure has been described with reference to one or more examples, workers skilled in the art will recognize that changes may be made in form and detail without departing from the scope of the disclosure and/or the appended claims.

The invention claimed is:

1. A method of telecommunication between a base station and user equipment such that an uplink transmission is according to grant-free, the method comprising the following acts performed by the user equipment:
   identifying first and second disjoint lists of pilots known to the base station and the user equipment, a first of which being for initial uplink transmissions and a second of which being for uplink retransmissions,
   defining a first mapping between the pilots of the first and second lists and defining at least two different patterns, each defining a sub-level of mapping between a pilot of the second list, referred to as a reference pilot, mapped with a pilot of the first list, referred to as a first pilot, used during a first uplink transmission and at least another pilot of the second list to be selected during an unlink retransmission so as to distinguish at least two different modes of retransmission,
   randomly selecting the first pilot from the first list by the user equipment during an initial uplink transmission,
   selecting a second pilot from the second list, during a retransmission, this second pilot being mapped with the reference pilot according to one of the patterns.

2. The method as claimed in claim 1, according to which one of the modes is an HARQ with incremental redundancy mode.

3. The method as claimed in claim 1, according to which one of the modes is an HARQ with repetition mode.

4. The method as claimed in claim 1, according to which at least two retransmissions are defined for one and the same transmission, and according to which for a given pattern the mapping sub-level is between the reference pilot and at least two other pilots of the second list that are used respectively for the at least two retransmissions.

5. A base station adapted to implement a method of telecommunication between the base station and user equipment such that an uplink transmission is according to grant-free, the base station comprising:
   a transmitter and a receiver which are linked to an antenna,
   a microprocessor and a memory, wherein:
   the memory is adapted to store first and second disjoint lists of pilots known to the base station and the user equipment, a first of which being for initial uplink transmissions and a second of which being for uplink retransmissions, and to store a first mapping between the pilots of the first and second lists, and to store at least two different patterns, each defining a sub-level of mapping between a pilot of the second list, referred to as a reference pilot, mapped with a pilot of the first list, referred to as a first pilot, used during a first uplink transmission and at least another pilot of the second list to be selected during an uplink retransmission so as to distinguish at least two different modes of retransmission and the microprocessor is configured to compare a pilot provided by the receiver after reception of data received by the antenna with the stored lists of pilots so as to determine whether the data received correspond to an initial transmission or to a retransmission and to compare the provided pilot with the different patterns to determine, in case of a retransmission, the retransmission mode.

6. A user equipment adapted to implement a telecommunication method such that an uplink transmission to a base station is according to grant-free, the user equipment comprising:

a transmitter and a receiver which are linked to an antenna, a microprocessor and a memory, wherein:

the memory is adapted to store first and second disjoint lists of pilots known to the base station, a first of which being for initial uplink transmissions and a second of which being for uplink retransmissions, and to store a first mapping between the pilots of the first and second lists, and at least two different patterns, each defining a sub-level of mapping between a pilot of the second list, referred to as a reference pilot, mapped with a pilot of the first list, referred to as a first pilot, used during a first uplink transmission and at least another pilot of the second list to be selected during an uplink retransmission so as to distinguish at least two different modes of retransmission, and the microprocessor is configured to randomly select a first pilot from among the first stored list of pilots during an initial uplink transmission and to control the transmitter to transmit a data packet comprising the first pilot, and the microprocessor is configured to select a second pilot from among the second stored list of pilots, this second pilot being mapped with the reference pilot according to one of the patterns, the microprocessor is configured to wait for an acknowledgment signal for a determined duration before controlling the transmitter for the uplink retransmission of the data packet comprising the second pilot.

* * * * *